May 23, 1961 O. O. JUDKINS 2,984,961
LAWN CLEANER
Filed May 27, 1959 3 Sheets-Sheet 3
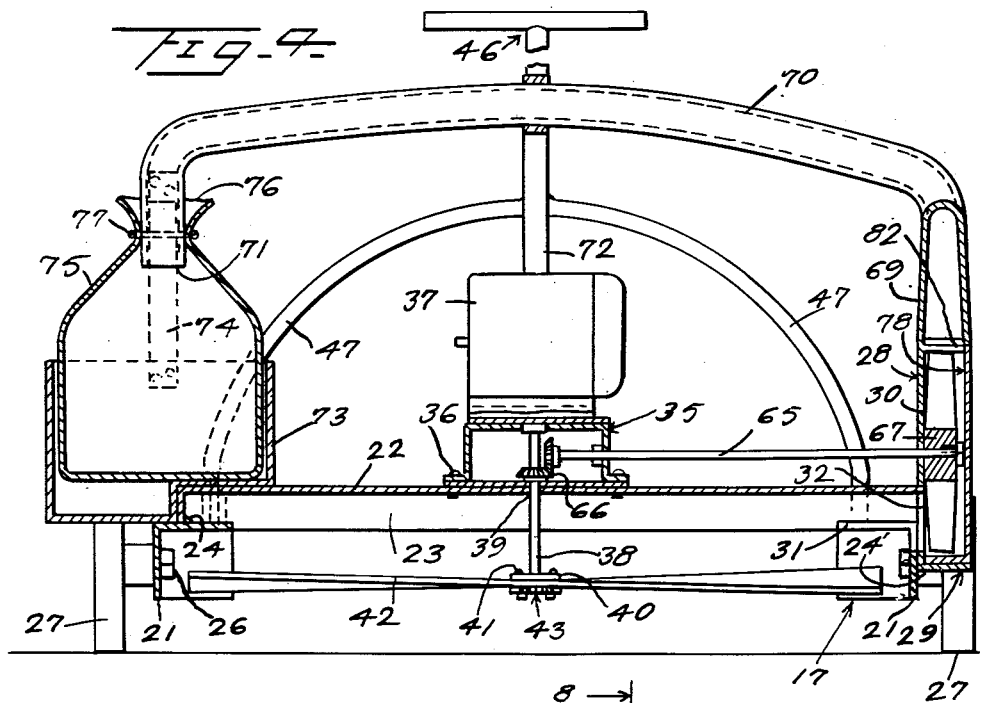
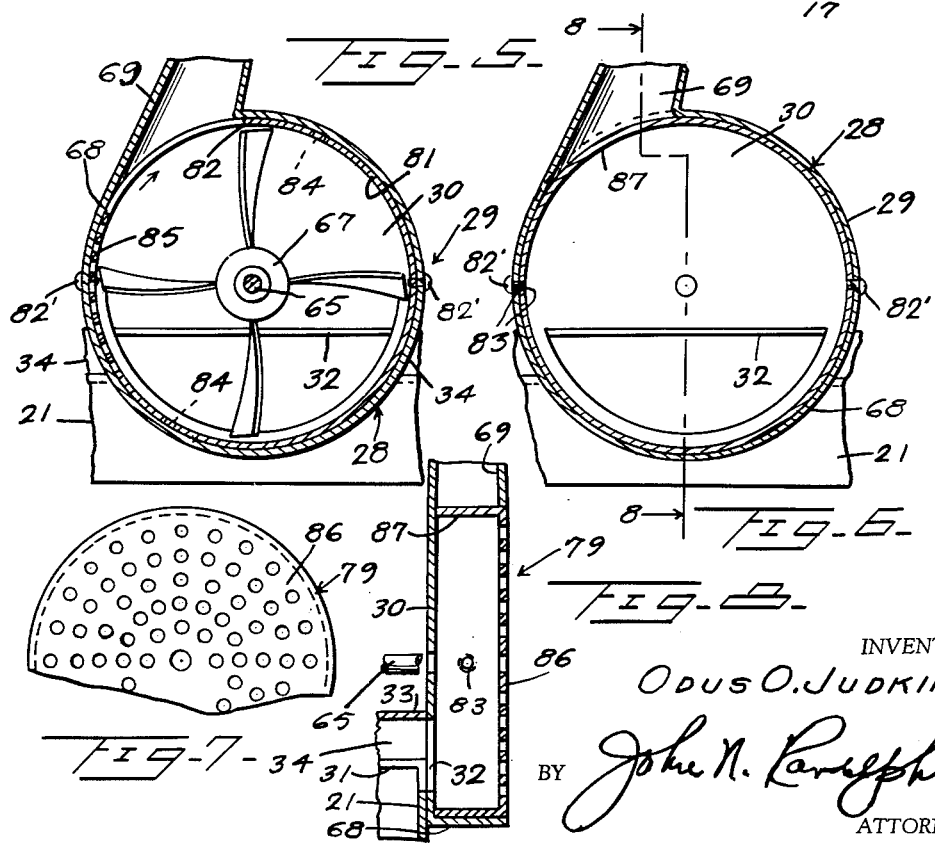
INVENTOR
ODUS O. JUDKINS
BY John N. Randolph
ATTORNEY

United States Patent Office 2,984,961
Patented May 23, 1961

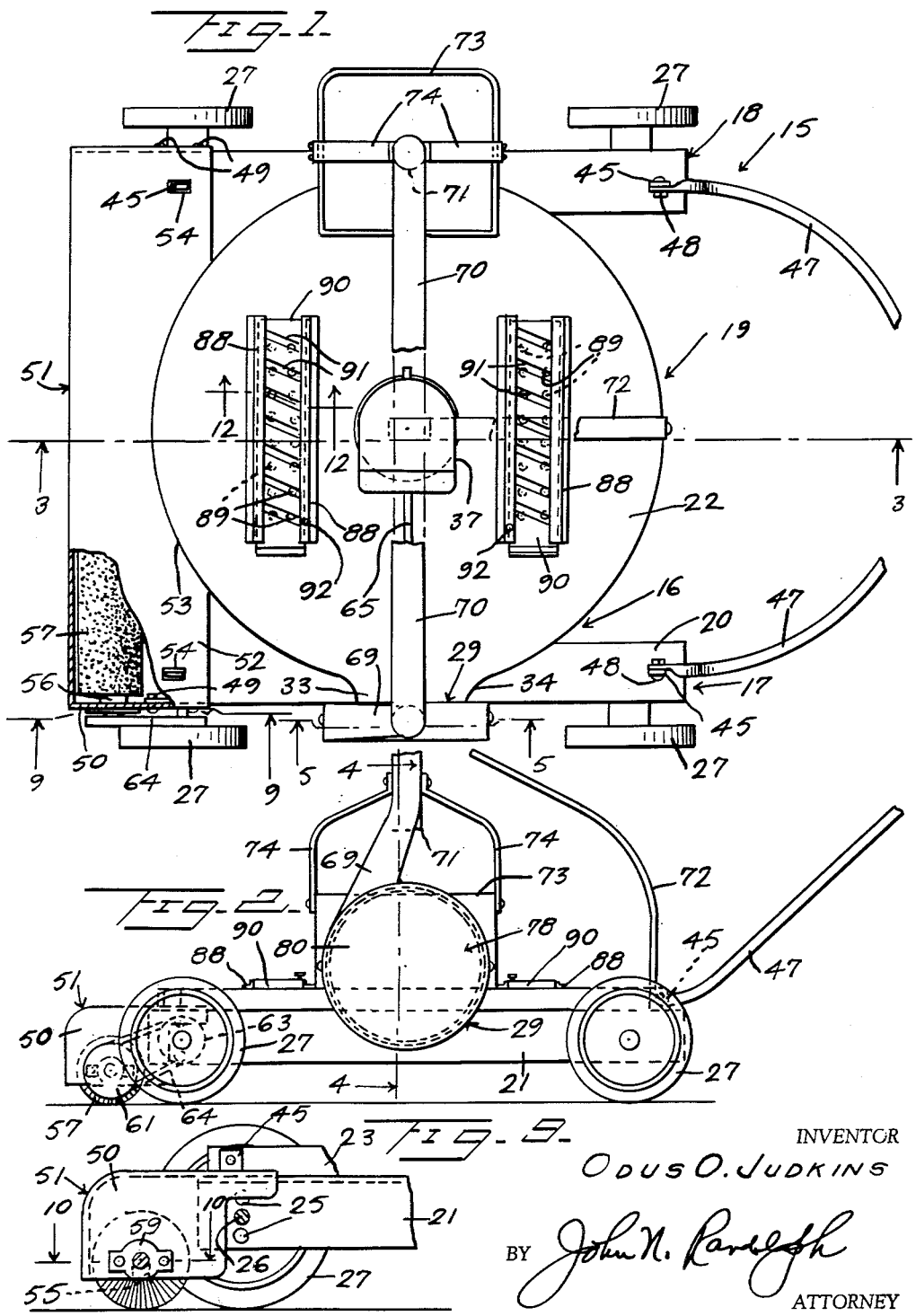

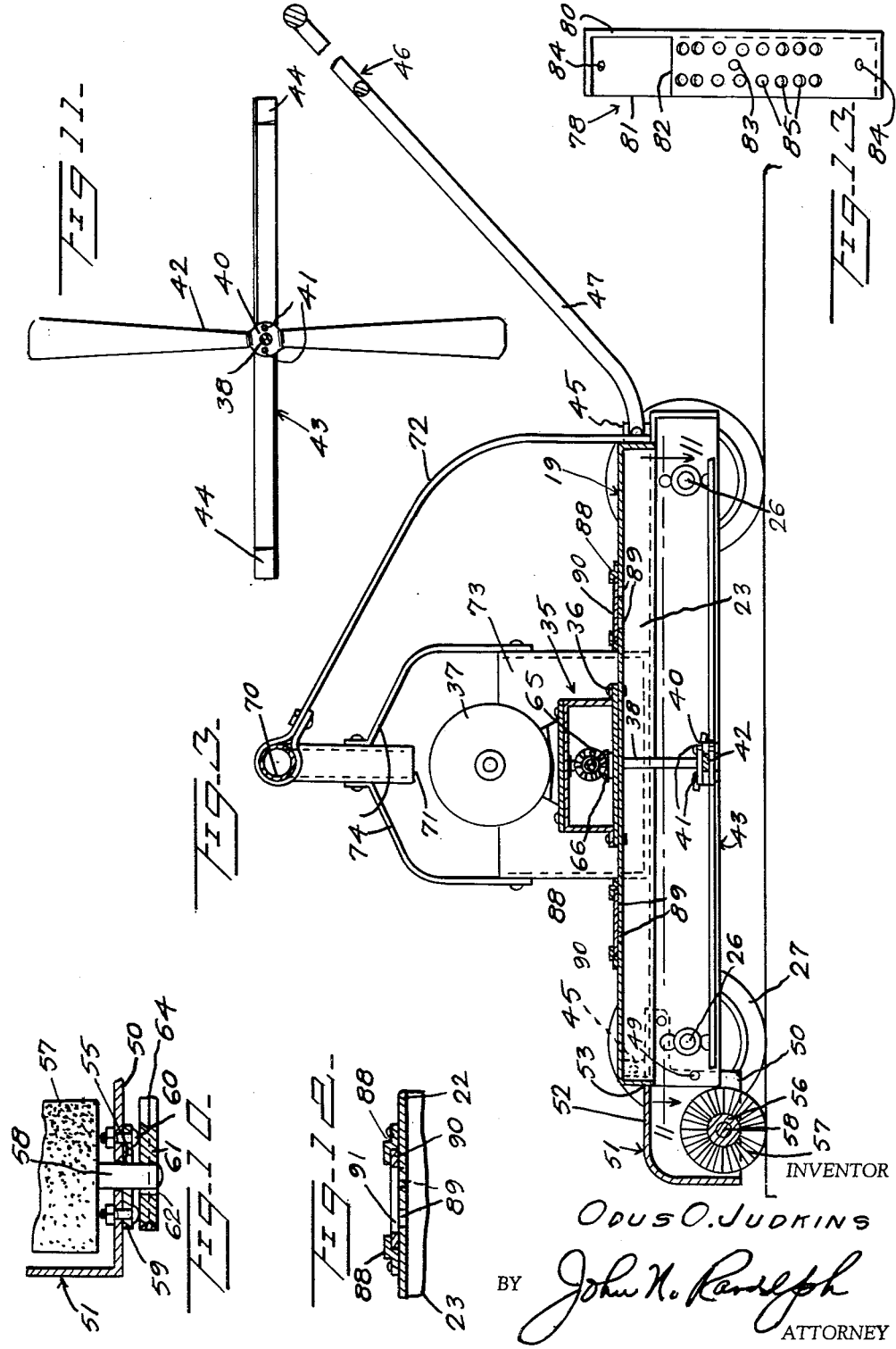

2,984,961
LAWN CLEANER
Odus O. Judkins, Rte. 3, Liberty, Tenn.
Filed May 27, 1959, Ser. No. 816,105
3 Claims. (Cl. 56—27)

This invention relates to a manually propelled machine equipped with power-driven means and which may be utilized as a lawn mower for cutting grass or for gathering leaves.

More particularly, it is an aim of the invention to provide a machine of the aforedescribed character which, when employed as a lawn mower, may either be utilized for gathering and bagging the clippings or for discharging the clippings laterally from either side of the machine.

A further object of the invention is to provide a machine which, when employed for gathering leaves from a lawn or the ground, may be adjusted for either bagging the whole leaves, pulverizing and bagging the leaves, or for pulverizing and discharging the leaves back onto the lawn or ground.

Still a further object of the invention is to provide a machine of the aforedescribed character capable of also being utilized for removing snow from walkways and the like.

Various other objects and advantages of the invention well hereinafter become more fully apparent from the following description of the drawings, illustrating a presently preferred embodiment thereof, and wherein;

Figure 1 is a fragmentary plan view, partly in horizontal section, of the lawn cleaner;

Figure 2 is a fragmentary side elevational view thereof;

Figure 3 is an enlarged longitudinal sectional view, partly broken away, taken substantially along a plane as indicated by the line 3—3 of Figure 1;

Figure 4 is an enlarged cross sectional view of the machine, taken substantially along a plane as indicated by the line 4—4 of Figure 2;

Figure 5 is an enlarged fragmentary vertical sectional view, taken substantially along the line 5—5 of Figure 1;

Figure 6 is a view similar to Figure 5, but with certain of the parts omitted, illustrating one of the parts of Figure 5 replaced by an alternately used part;

Figure 7 is a fragmentary elevational view looking toward the outer side of the alternately used part of the blower casing as shown in Figure 6;

Figure 8 is a vertical sectional view through the blower casing, assembled as shown in Figure 6, taken along the line 8—8 of Figure 6;

Figure 9 is an enlarged fragmentary vertical sectional view, primarily in side elevation, taken substantially along the line 9—9 of Figure 1;

Figure 10 is a fragmentary horizontal sectional view, taken substantially along the line 10—10 of Figure 9;

Figure 11 is a horizontal sectional view, in detail, taken substantially along the line 11—11 of Figure 3, illustrating the assembly of the cutting blades and fan blades;

Figure 12 is a fragmentary vertical sectional view, on an enlarged scale, taken substantially along the line 12—12 of Figure 1, and Figure 13 is an edge elevational view of the replaceable blower casing part, shown in Figure 5.

Referring more specifically to the drawings, the lawn cleaning machine in its entirety is designated generally 15 and includes a frame 16 composed primarily of two side frame members 17 and 18 and a hood 19. Each of the side frame members 17 and 18 has a substantially horizontal top wall 20 and a depending outer side wall 21. The hood 19 is substantially circular and includes a substantially flat top wall 22 having a depending peripheral flange 23, portions of which flange 23 rest upon and are secured, as by welding, as seen at 24 in Figure 4, to intermediate portions of the coplanar top walls 20 of the side frame sections 17 and 18, for positioning said frame sections in spaced apart substantially parallel relation to one another. The diameter of the hood 19 is nearly equal to the length of the sections 17 and 18, as seen in Figures 1 and 2.

The side walls 21 of the sections 17 and 18, adjacent the ends thereof, are provided with vertically spaced openings 25. An axle 26 selectively engages one of the openings 25 of each end of each of the walls 21. Wheels 27 are journaled on the axles 26 and disposed on the outer sides of the frame sections 17 and 18 to provide a mobile support for the frame.

As best seen in Figures 1 and 4, an inner half 28, of a blower casing 29, is supported by the frame section 17, between and spaced from the ground wheels 27 of said frame section, and said casing half 28 includes a disc shaped inner side wall 30, the lower portion of which is secured, as by welding as seen at 24', to the outer side of the wall 21 of the section 17. The walls 20 and 21 of the section 17 have connecting openings 31 which open into a part of the hood 19 and into the blower casing 29, through an opening 32 of the wall 30. The top wall 22 of the hood 19 has an extension 33 which extends to and is secured against the inner casing wall 30, immediately above the opening 32, and the depending wall or flange 23 has spaced flared portions 34 which abut against and are secured to the wall 30 at the ends of the opening 32, so that the hood 19 likewise opens into the blower casing 29 through the opening 32, as best illustrated in Figure 4.

A gear box 35 is mounted contrally on the upper side of the top wall 22 of the hood, and may be secured thereto by suitable fastenings 36. A power source 37, which may be a gasoline engine or electric motor, is mounted on and secured to the top of the gear housing 35 and has a rotary driven shaft 38 extending downwardly through said gear housing and through an opening 39 in the top wall 22. The shaft 38 terminates at its lower end in a disc shaped head 40. Fastenings 41 are secured to and extend downwardly from the head 40 through the hub of a fan or propeller 42, and also through the hub of a rotary cutting blade 43, which are thus secured to the under side of the shaft head 40 for rotation therewith. As best seen in Figure 11, the fan 42 preferably has two aligned blades which are disposed crosswise of the cutting blade 43. The cutting blade 43 may be of any suitable construction and preferably includes end portions having sharpened leading edges 44, and which end portions are pitched downwardly from the trailing edges to the leading edges thereof. The blades 42 and 43 are revolved in a clockwise direction, as seen in Figure 11, when the power source 37 is in operation.

Each of the top walls 20 is provided with an upstanding apertured lug 45, adjacent each end thereof. A handle 46 has a forked end the furcations 47 of which are apertured to receive fastenings 48 for detachably securing the handle to the lugs 45 at either end of the frame 16, so that the handle 46 can extend upwardly and outwardly from either frame end.

The handle 46 is shown mounted at one end of the frame 16 in the drawings, and the side walls 21, at the other end of the frame, are apertured to receive fastenings 49 which extend through end walls 50 of a downwardly opening hood or shield 51, which is detachably mounted by the fastenings 49 on the end of the frame 16, located remote from the handle 46. The hood 51 extends forwardly from said frame end, and includes a top wall 52 which overlies portions of the top walls 20 of the side portions 17 and 18 and which is notched, as seen at 53 in Figure 1, to accommodate a portion of the depending flange 23. Said top wall 52 has slots 54 through which the lugs 45, located in the portions of the walls 20 which are covered by the top wall 52, project.

The end walls 50 have downwardly opening notches 55. A hub 56 of a rotary brush 57 is mounted on the shaft 58, the ends of which project from the ends of said hub and can be inserted upwardly into the notches 55. Bearing members 59 engage over the ends of the shaft 58, which project outwardly from said end walls 50, and are secured by fastenings 60, as best seen in Figure 10, to the outer sides of the end walls 50 for supporting and journaling the shaft 58 and the brush 57, which is mounted thereon. A belt pulley 61 is secured, as by a key 62, to one exposed end of the shaft 58. A belt pulley 63 is fixed to the inner side of the wheel 27, located adjacent the pulley 61, and said pulleys 63 and 61 are coupled to one another by an endless belt 64.

A blower shaft 65 is disposed crosswise of the shaft 38 and has a portion journaled in a side wall of the gear housing 35 and another portion extending centrally through and journaled in the blower casing wall 30. The inner end of the shaft 65 is connected by meshing bevel gears 66 to the shaft 38, to rotate in unison therewith. A fan or impeller 67 is detachably secured to the outer end of the shaft 65 and is supported thereby for rotation in the fan casing 29, as best seen in Figures 4 and 5. As best seen in Figures 5, 6 and 8, the inner fan casing half 28 includes a substantially annular surrounding wall 68 which projects outwardly from the periphery of the wall 30 and which is provided with an integral tubular extension forming an outlet passage 69 which opens into the fan casing 29 and which extends upwardly therefrom. Said outlet 69 has an integral tubular continuation 70 which extends transversely across the frame 16, above the power source 37, and which is provided with a down-turned open discharge end 71. A brace 72 has an upper end secured to the intermediate portion of the tube 70 and extends downwardly therefrom, in a direction away from the hood or shield 51, and has its opposite end secured to a part of the periphery of the hood 19, for supporting the intermediate portion of the tube 70.

An open top container 73 has a stepped bottom which is supported partially on the hood 19 and partially on the frame section 18, remote from the blower casing 29, as seen in Figure 1, and beneath the outlet tube end 71. Strap members 74 are fixed to and extend upwardly from the container 73 and are secured to the tube 70, adjacent to but above the outlet end 71 thereof, for bracing said outlet end. A porous bag or sack 75 is supported in the container 73 and has its neck or open end 76 disposed around the tube 70 and secured thereto by a tie member or ring 77, so that the discharge end 71 opens downwardly into the interior of the sack 75.

The blower casing 29 is provided with interchangeable outer halves 78 and 79. The outer casing half 78, illustrated in Figures 2, 4 and 5, includes a solid disc shaped outer wall 80 having an inwardly extending peripheral flange 81 which fits detachably and turnably in the flange 68 and which has a gap or elongated opening 82 which may be disposed to register with the blower casing outlet 69, in one position of the casing half 78 relative to the casing half 28, as illustrated in Figures 4 and 5. When the casing half 78 is thus disposed, screws 82' are threaded through aligned openings 83 of the walls 68 and 81, for securing the casing halves together with the opening 82 in registration with the blower casing outlet 69. The blower casing half 78 can be rotated in the blower casing half 28 to position the openings 84 of the wall 81 in alignment with the openings 83 of the wall 68 to receive the screws 82', for securing the casing halves together and so that the opening 82 will be out of registration with the outlet 69 and a perforated portion 85, of the wall 81, will be disposed over the outlet 69, for a purpose which will hereinafter be described. Said casing half 78 is best illustrated in Figure 13.

By removing the fastenings 82', the casing half 78 can be removed and replaced by the casing half 79 having a perforated disc shaped side wall 86 and an unbroken annular wall 87 which is sized to fit within the wall 68 and which has threaded openings 83 disposed to register with the openings 83 of the wall 68 for receiving the fastenings 82'.

The top wall 22 of the hood 19 has two sets of guideways 88 fixed to the upper side thereof, and said hood is provided with a plurality of vent openings 89, located between the guideways of each set. A valve plate 90 is slidably mounted in each pair of guideways 88 and is provided with diagonal slots 91 for exposing a portion of the vent openings 89, over which said valve 90 is mounted. One guideway 88 of each pair has an adjustable setscrew 92 threaded therethrough and which can be tightened against the valve 90 thereof for retaining said valve in a desired set position.

For the purpose of the description, the right hand end of the frame 16, as seen in Figures 1 and 3, from which the handle 46 projects, will be considered the rear end thereof and the left hand end of the frame, on which the brush supporting shield 51 is mounted, will be considered the forward end of the frame. The machine 15 is propelled from right to left of Figures 1 to 3, when assembled as illustrated in these views. As the machine 15 is propelled forwardly the grass will be cut by the revolving cutting blade 43 and will be propelled upwardly into the hood 19 by the fan blade 42. The grass clippings will be drawn through the upper portion of the hood 19 toward the hood outlet 33, 34 and into the blower casing through the inlet 32 thereof by the suction of the fan 67. If it is desired to collect and bag the grass clippings, the outer blower casing section 78 will be utilized in its position of Figures 4 and 5 so that the grass clippings will be expelled from the blower casing through the outlet 69 and propelled through the tube 70 into the porous bag 75. In cutting grass and discharging the grass clippings laterally from the machine 15, the handle furcations 47 can be connected to the lugs 45 at the left hand end of the machine so that the machine can be propelled from left to right, as seen in Figures 1 to 3, rather than from right to left, and so that the grass clippings will be discharged laterally from the opposite side of the machine, in relation to its direction of movement. As the machine 15 is manually propelled from right to left, as seen in Figures 1 to 3, the rotary brush 57 will be driven by the belt and pulley drive in the same direction as the wheel 27 to which it is connected, or counterclockwise as seen in Figures 3 and 9, for brushing the leaves upwardly and rearwardly toward the fan blades 42. The leaves will be elevated into the upper part of the hood 19 by the fan blades and will then be drawn laterally by the blower fan 67 into the blower casing 29 through the opening 32 thereof. The vent openings 89 will allow sufficient air to escape from the top of the hood 19 to avoid the creation of a back pressure which would tend to prevent lifting of the leaves by the fan blades 42.

If it is desired to bag the whole leaves as picked up from the lawn, the outer blower casing half 78 is utilized applied as shown in Figures 4 and 5, with the opening 82 thereof registering with the blower outlet 69, so that the whole leaves, not shown, will be blown through said outlet 69 and tube 70 into the sack 75. If it is desired to pulverize and sack the leaves, the casing half 78 will be positioned as heretofore described with its perforated portions 85 disposed over the outlet 69, for retaining the leaves in the blower casing until sufficiently pulverized by the blades of the fan 67, so that leaf particles can escape through the perforations of the parts 85 and can then be propelled through the tube 70 and discharged into the sack 75. If it is desired to pulverize the leaves and discharge the leaf particles back onto the lawn without sacking, the blower casing half 79 is substituted for the casing half 78 so that a part of the annular wall 87 will function as a valve portion to seal off the outlet 69 and so that the leaves will be confined in the blower casing until pulverized sufficiently by the blades of the fan 67, so that the leaf particles can escape through the perforations of the outer casing wall 86.

Various modifications and changes are contemplated and may be resorted to, without departing from the function or scope of the invention as hereinafter defined by the appended claims.

I claim as my invention:

1. A lawn cleaner comprising an elongated mobile frame having a closed hood, a side portion and an open bottom, a power source, means supporting the power source on the frame and above the closed top thereof, a rotary driven shaft extending downwardly from the power source through the closed top of the frame, at least one propeller fixed to said shaft for rotation therewith in the open bottom of the frame for creating an updraft into the frame, a blower including a casing fixed to and supported by said side portion of the frame and having an inner wall provided with an inlet opening, said side portion having an opening communicating with the blower casing opening and with the interior of the frame, a blower shaft having one end extending into the blower casing through said inner wall thereof, an impeller, forming a part of said blower, fixed to said end of the blower shaft for rotation therewith within the blower casing, means forming a driving connection between said first mentioned shaft and the blower shaft for rotating the blower shaft in unison with said first mentioned shaft and whereby leaves and grass clippings drawn upwardly by operation of the propeller into said frame are drawn into the blower casing by the impeller, said blower casing having an outlet, and said blower casing including a foraminous portion associated with said outlet whereby materials drawn into the blower casing are pulverized before being discharged therefrom.

2. A lawn cleaning machine as in claim 1, ground engaging wheels supporting said frame, said frame including a forward end, a downwardly opening shield, means detachably supporting said shield on the forward end of the frame, a rotary brush journaled in and supported by said shield and disposed crosswise of the frame, and means forming a driving connection between one of said ground wheels and the brush for revolving the brush in a direction for brushing elements, over which the brush passes, upwardly and rearwardly toward the open bottom of the frame and into the path of the updraft created by the propeller when the machine is being propelled in a forward direction.

3. A lawn cleaner comprising an elongated mobile frame having a closed top, a side portion and an open bottom, a power source, means supporting the power source on the frame and above the closed top thereof, a rotary driven shaft extending downwardly from the power source through the closed top of the frame, at least one propeller fixed to said shaft for rotation therewith in the open bottom of the frame for creating an updraft into the frame, a blower including a casing fixed to and supported by said side portion of the frame and having an inner wall provided with an inlet opening, said side portion having an opening communicating with the blower casing opening and with the interior of the frame, a blower shaft having one end extending into the blower casing through said inner wall thereof, an impeller, forming a part of said blower, fixed to said end of the blower shaft for rotation therewith within the blower casing, means forming a driving connection between said first mentioned shaft and the blower shaft for rotating the blower shaft in unison with said first mentioned shaft and whereby leaves and grass clippings drawn upwardly by operation of the propeller into said frame are drawn into the blower casing by the impeller, said blower casing having an outlet and a foraminous portion associated with said outlet whereby materials drawn into the blower casing are pulverized before being discharged therefrom, said inlet and outlet constituting parts of a stationary section of the blower casing, said blower casing having an adjustable and detachable section of which said foraminous portion forms a part, and means detachably and adjustably securing said adjustable and detachable section to the stationary section.

References Cited in the file of this patent

UNITED STATES PATENTS

| | | |
|---|---|---|
| 2,538,643 | Gregory | Jan. 16, 1951 |
| 2,712,211 | Smith et al. | July 5, 1955 |
| 2,779,146 | Mitchell et al | Jan. 29, 1957 |
| 2,809,389 | Collins et al. | Oct. 15, 1957 |
| 2,843,991 | Poehls | July 22, 1958 |
| 2,857,728 | Smith et al | Oct. 28, 1958 |
| 2,905,963 | Boyer | Sept. 29, 1959 |

FOREIGN PATENTS

| | | |
|---|---|---|
| 728,883 | Great Britain | Apr. 27, 1955 |